United States Patent [19]
Conrad et al.

[11] Patent Number: 5,305,676
[45] Date of Patent: Apr. 26, 1994

[54] LOW RETENTION FORCE RELEASE AND ARMING MECHANISM FOR ORDINANCE DEVICES

[75] Inventors: Coleman W. Conrad, Whittier; Charles H. Pearson, Riverside, both of Calif.

[73] Assignee: BW/IP International, Inc., Long Beach, Calif.

[21] Appl. No.: 27,707

[22] Filed: Mar. 8, 1993

[51] Int. Cl.⁵ .................... B64D 1/04; F41F 5/02
[52] U.S. Cl. .................... 89/1.55; 294/82.32
[58] Field of Search .......... 89/1.55; 294/82.32, 294/82.33, 82.24

[56] References Cited

U.S. PATENT DOCUMENTS

| | | | |
|---|---|---|---|
| 2,992,594 | 7/1961 | Anderson et al. | 89/1.55 |
| 3,012,811 | 12/1961 | Sandrock | 294/82.32 |
| 3,200,707 | 8/1965 | West | 89/1.55 |
| 3,831,486 | 8/1974 | Yost | 89/1.55 |
| 3,945,295 | 3/1976 | Robison | 89/1.55 |
| 3,998,124 | 12/1976 | Milhous et al. | 89/1.55 |
| 4,088,055 | 5/1978 | West et al. | 89/1.55 |
| 4,179,150 | 12/1979 | Conrad et al. | 89/1.55 |
| 4,212,225 | 7/1980 | Correll, Sr. et al. | 89/1.55 |
| 4,266,462 | 5/1981 | Carter et al. | 89/1.55 |
| 4,467,695 | 8/1984 | Bonde | 89/1.55 |
| 4,520,711 | 6/1985 | Robinson | 89/1.55 |
| 4,528,890 | 7/1985 | Carter | 89/1.55 |
| 4,555,133 | 11/1985 | Danielsen et al. | 294/82.24 |
| 4,658,698 | 4/1987 | Billot | 89/1.55 |
| 4,682,530 | 8/1987 | Brown et al. | 89/1.55 |
| 4,706,541 | 11/1987 | Coutin | 89/1.55 |
| 4,754,686 | 7/1988 | Guitaut et al. | 89/1.55 |
| 5,052,271 | 10/1991 | West | 89/1.55 |

FOREIGN PATENT DOCUMENTS 14753 6/1913 United Kingdom ............ 294/82.32

*Primary Examiner*—David H. Brown
*Attorney, Agent, or Firm*—Pretty, Schroeder, Brueggemann & Clark

[57] ABSTRACT

A release and arming mechanism for an ordnance device having an arming block, a pair of opposed jaws pivotally mounted to the arming block, and a solenoid that, when energized, holds the jaws in a closed position around an arming wire. A release lanyard connectable to the ordnance device is clipped to the jaws in such a manner as to hold the jaws in the closed position until such time as the ordnance device is launched. A spring may be placed between the jaws below their pivot points to force the jaws open upon disconnection of the release lanyard.

19 Claims, 4 Drawing Sheets

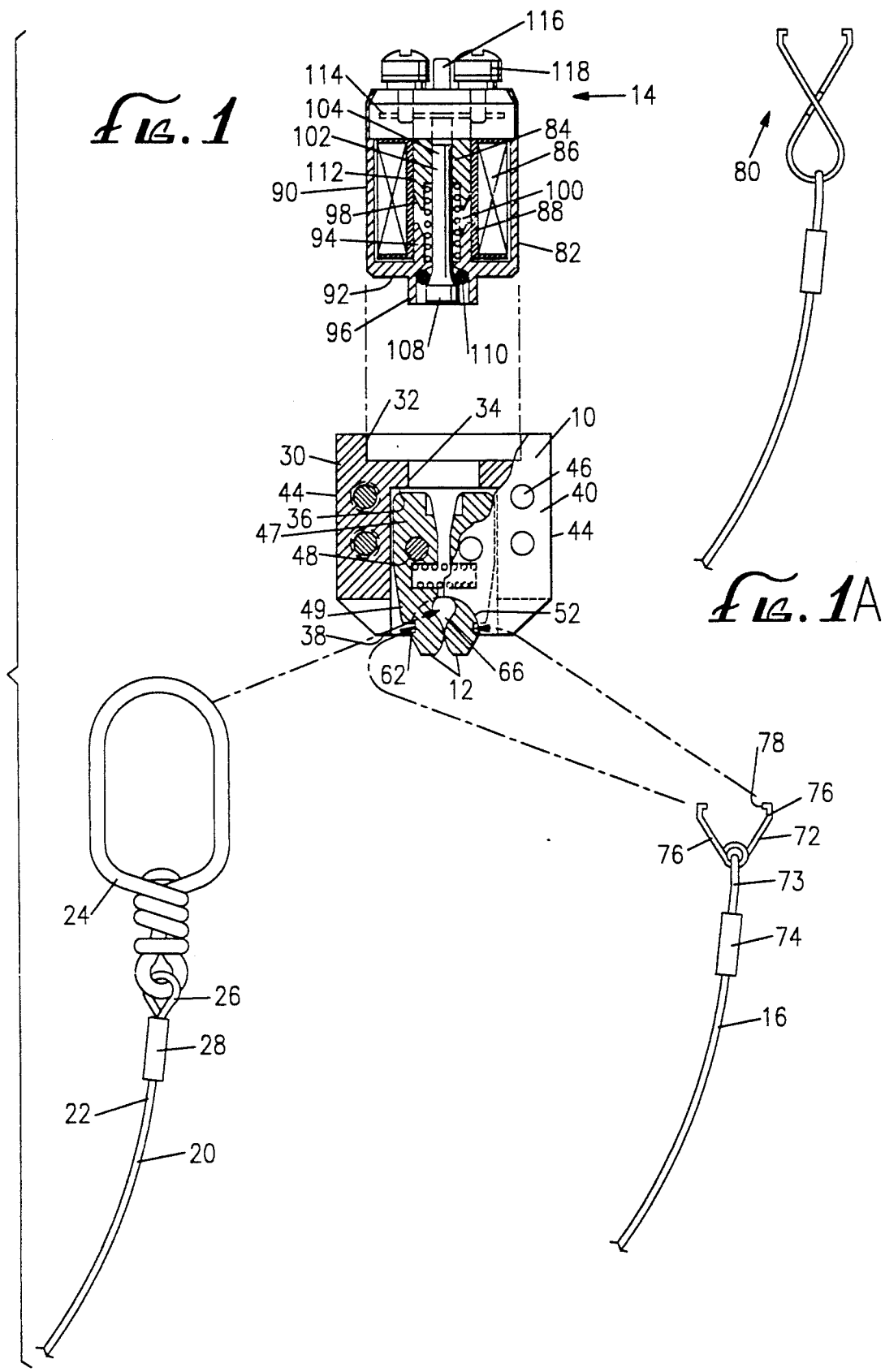

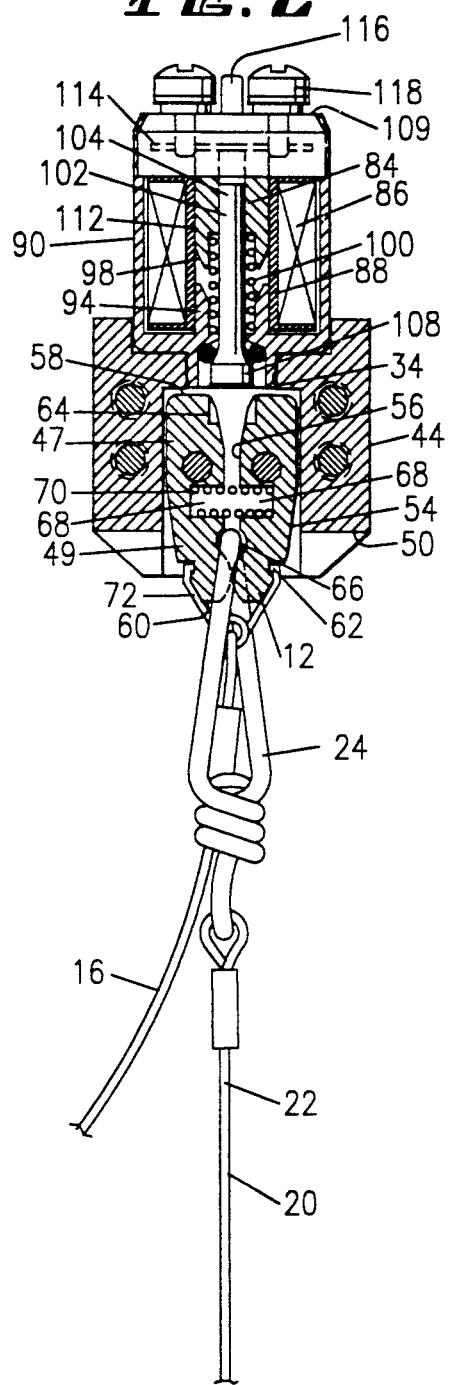
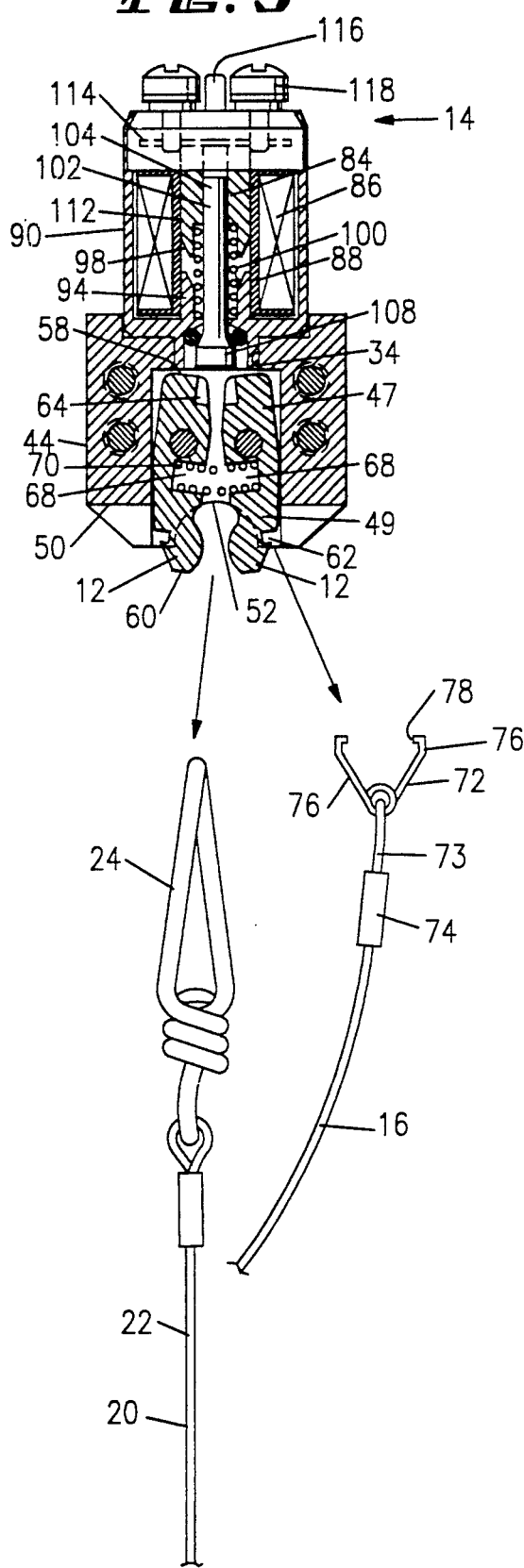

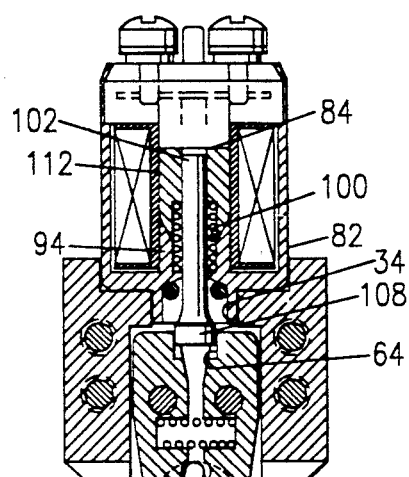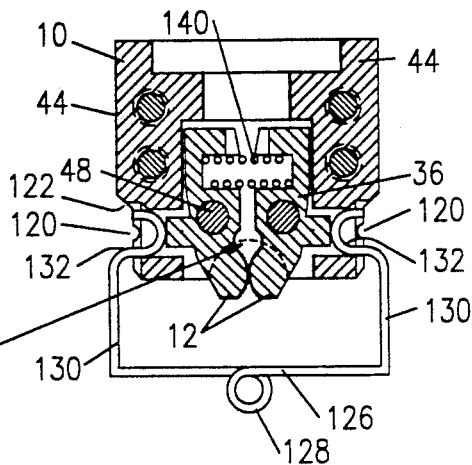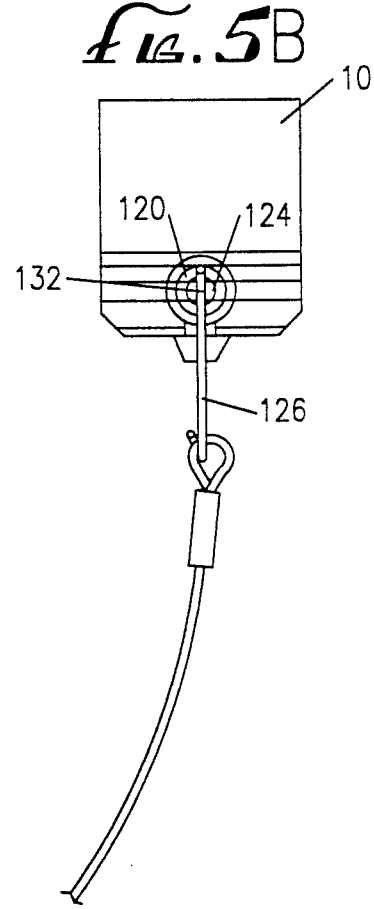

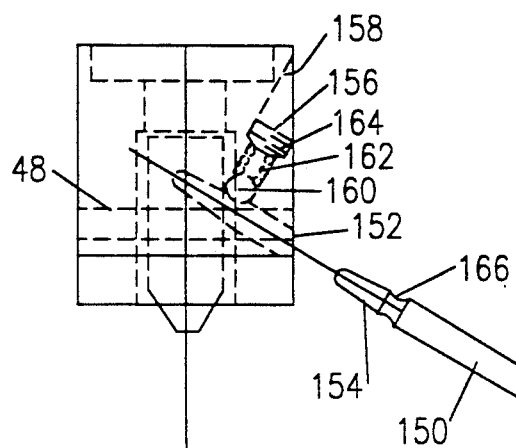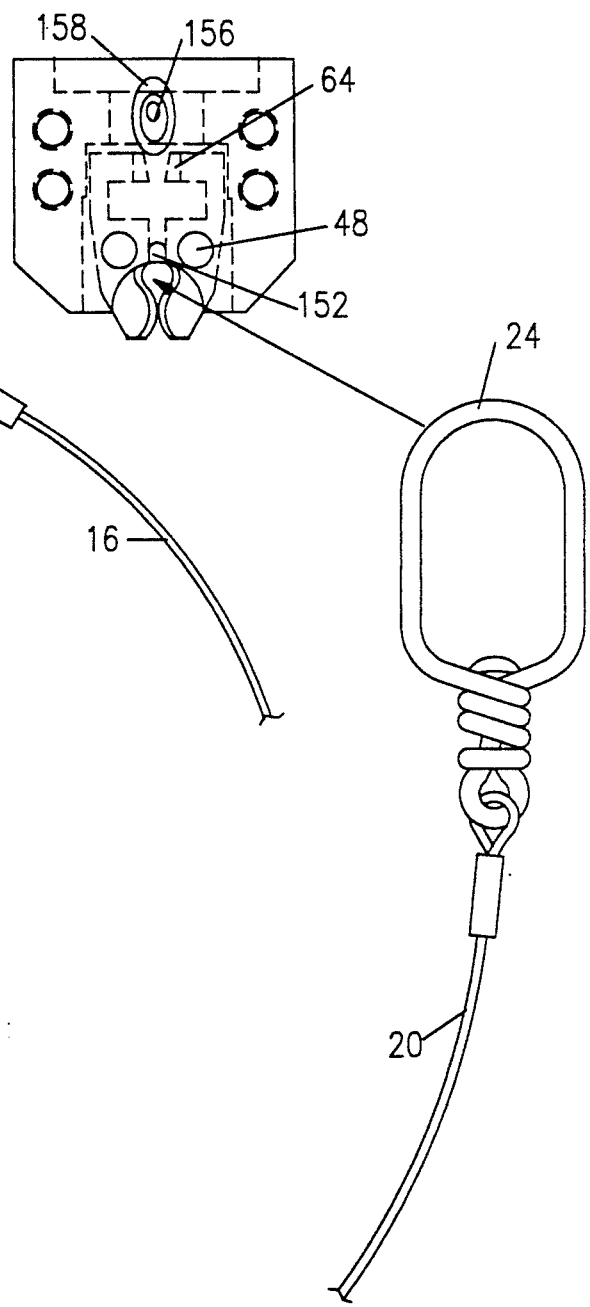

LOW RETENTION FORCE RELEASE AND ARMING MECHANISM FOR ORDINANCE DEVICES

This invention relates generally to a release and arming mechanism for ordnance devices and, in particular, to a jaw-type release and arming mechanism that applies a zero retention force or a low-retention force against an arming wire associated with the ordnance device when the ordnance device is to be released in an unarmed condition.

BACKGROUND OF THE INVENTION

Release and arming mechanisms for ordnance devices are well known in the art. For obvious safety reasons, ordnance devices are carried on aircraft in an unarmed or non-explosive condition, subject to being armed after release to provide an armed or live ordnance device. When an ordnance device is released from a bomb rack or otherwise ejected or launched, it remains in a "safe" condition in which it will not detonate unless an arming wire connecting the ordnance device to the aircraft is held by a sufficient force to arm the ordnance device.

The arming wire is typically attached to the aircraft or other carrier by an arming mechanism, which, in its normal non-energized state, holds the arming wire against the forces of gravity, acceleration and wind, but releases the arming wire at a tension insufficient to arm the ordnance device. When electrically energized, however, the arming mechanism secures the arming wire in a non-releasable manner so that the ordnance device can be launched in an armed condition. The arming mechanism ensures that any ordnance device unintentionally launched will remain in a safe condition and permits the ordnance device to be intentionally launched in a safe condition, as when it is desired to unload ordnance devices prior to a landing.

According to most military specifications, a typical arming mechanism in an unenergized condition should retain the arming wire up to a predetermined force of 10 to 14 pounds. This retention force was considered to be sufficient to retain the arming wire until the ordnance device was released from the aircraft. After release, the weight of the ordnance device was then considered sufficient to overcome the retention force, pulling the arming wire from the arming mechanism and maintaining the ordnance device in an unarmed condition. It is now known, however, that under some dynamic loading conditions the specified 10 to 14 pound static retention force increases significantly, preventing the arming wire from pulling loose from the arming mechanism. Much of the inadvertent arming of ordnance systems or weaponry has occurred because of the occurrence of these loading conditions.

To overcome this problem, zero retention force mechanisms have been developed to insure that the unenergized arming mechanism will release the arming wire after the ordnance device is launched. One such device is shown and described in U.S. Pat. No. 4,266,462 issued to Carter et al. Such prior devices, however, require major redesign to the delivery system and can be relatively expensive. Furthermore, these special devices and delivery systems are not interchangeable in all applications with old ordnance delivery systems, which have been in the field for many years. For example, no suitable zero retention force mechanisms have been developed for jaw-, ball- or cone-type release and arming mechanisms.

It should, therefore, be appreciated that there is still a need for an improved release and arming mechanism that enables field replacement on many old jaw-, ball- or cone-type ordnance delivery systems while updating the delivery system with a zero retention force or low retention force capability. Such a mechanism should also increase system reliability and should prevent any catastrophic failure. The present invention satisfies this need.

SUMMARY OF THE INVENTION

The present invention is embodied in a release and arming mechanism that has zero retention force capability. The mechanism is particularly suitable for field replacement, thus enabling zero retention force armament releases on existing ordnance delivery systems. The mechanism is also relatively inexpensive and adaptable for use in new installations.

The release and arming mechanism of the present invention includes an arming block that may be mounted to an aircraft or other carrier. A pair of opposed jaws are mounted to the arming block, with at least one of the jaws being movable such that the jaws may assume a closed position and an open position. The jaws are configured to retain an arming wire between them when held in the closed position. A solenoid is also mounted to the arming block such that, when energized, it holds the jaws in the closed position. A release lanyard connected to an ordnance device is clipped to the jaws in such a manner as to hold the jaws in the closed position until such time as the ordnance device is launched from the aircraft.

A number of different clips are disclosed for holding the jaws in the closed position. In one embodiment, the lower portions of the jaws are channel cut along their outside surfaces for receiving a two-pronged spring clip. The prongs apply a compression force on the outside of the jaws, retaining them in the closed position. In another embodiment, the outside surfaces of the jaws have protrusions that extend into respective openings in the arming block. A two-pronged spring clip is also inserted into the other side of the respective openings and into a contacting relation with the protrusions of the jaws to hold the jaws in the closed position. In yet another embodiment, the clip is in the form of a jaw retaining lanyard that is held in place by a detent mechanism. In this case, the jaw retaining lanyard is placed between the upper ends of the jaws, preventing the upper ends from pivoting toward each other, thus keeping the lower ends of the jaws closed.

A feature of the present invention is that the release lanyard will be disconnected from the jaws upon launching of the ordnance, thus the jaws will be free to open and will not retain the arming lanyard when the solenoid is unenergized. To further ensure that the jaws open upon disconnection of the release lanyard, a low force spring may be placed between the jaws below their pivot points to force the jaws open upon disconnection of the release lanyard. As an alternative, the spring may be placed above the pivot points of the jaws creating a low force retention device. A significant feature of this device is that it allows an easier and one-hand insertion of the arming wire and spring clip. In such a device, a spring bias of a couple ounces of force (as opposed to the specified 10–14 lb. force) would be exerted on the jaws, which is just sufficient to retain the arming wire during hook-up.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 1 is an unassembled view, partially in section, of a jaw-type release and arming mechanism made in accordance with the present invention. FIG. 1A is a modified clip that may be used with the mechanism shown in FIG. 1.

FIG. 2 is an assembled sectional view of the mechanism shown in FIG. 1 showing the mechanism in an unenergized state with the arming wire and release lanyard connected to the jaws.

FIG. 3 is an assembled sectional view of the mechanism shown in FIG. 1, showing the mechanism in an unenergized state after the release lanyard has been disconnected.

FIG. 4 is an assembled sectional view of the mechanism shown in FIG. 1, showing the mechanism in an energized state after the release lanyard has been disconnected.

FIGS. 5A and 5B are a sectional front view and a side view, respectively, of a first modified release and arming mechanism made in accordance with the present invention.

FIGS. 6A and 6B are a front view and side view, respectively, of a second modified release and arming mechanism made in accordance with the present invention.

DETAILED DESCRIPTION OF THE PREFERRED EMBODIMENT

A jaw-type release and arming mechanism embodying the features of the present invention is shown in an unassembled condition in FIG. 1. The mechanism includes an arming block 10, a pair of opposed pivoting jaws 12, a solenoid 14 and a release lanyard 16. An arming wire 20 to be connected to the release and arming mechanism is also shown. FIG. 2 shows the mechanism assembled with the arming wire 20 in place between the jaws.

The arming wire 20 includes an arming lanyard 22 having an arming ring 24. The arming ring 24 is securely fixed to one end 26 of the arming lanyard, for example, by a staked or crimped sleeve 28. The other end of the arming lanyard may be fixed to the fuse of an ordnance device (not shown).

The arming block 10 may be made of steel or other suitable material. The arming block has a top end 30 defining a circular bore 32 and a concentric counterbore 34. The counterbore communicates with a recess 36 extending from a lower end 38 of the arming block. A plurality of through holes pass through the arming block from a front surface 40 to a rear surface 42 for receiving fasteners 46 for fastening the arming block to a bomb rack or other carrier (not shown. The two jaws 12 are pivotably mounted to the arming block by two pivot pins 48. The two pivot pins 48 are mounted parallel to each other the arming block between the front and rear surfaces and passing through the recess. Alternatively, the orientation of the jaws may be turned 90 degrees by lowering the pivot pins to avoid the fasteners and mounting the pivot pins between side surfaces 44 of the arming block.

The jaws 12 are adapted to fit within the recess 36 of the arming block and are pivotally mounted in opposed relationship on the pivot pins 48. Each jaw has an upper portion 47 above its respective pivot pin and a lower portion 49 below its respective pivot pin. The jaws may assume either a closed position as shown in FIG. 2 for holding the arming ring 24 or an open position as shown in FIG. 3. The side surfaces 44 of the arming block include notches 50 extending up from the lower end of the arming block and aligned with the jaws, permitting the jaws to open fully. The notches 50 may be arched at their upper ends.

The front and rear surfaces of the arming block have arched notches 52 extending up from the lower end of the arming block and centered on the closed jaws, permitting the arming ring to be inserted between the jaws. The notches 50, 52 provide the arming ring a 45° cone of revolution. This permits the arming ring to move freely during transport of the ordnance device and minimizes the possibility that the arming ring may lock up against the arming block, which could result in premature release of the arming ring or other undesirable consequences.

Each jaw is alike having an outer surface 54, an inner surface 56, a top end 58 and a bottom end 60. The outer surface tapers toward the bottom end of the jaw and includes a channel cut 62 across the outside surface adjacent the bottom end. The top end of each jaw is notched at the inner surface such that the notches of both jaws form an open space 64 that is aligned with the counterbore 34 of the arming block. At their bottom ends, the jaws are beveled along their inner surfaces and define an enclosure 66 for receiving and holding the arming ring 24 of the arming wire 20 when the jaws are closed. The inner surfaces of the jaws, below the pivot point, have opposed bores 68. Disposed in the bores is a biased spring 70. Because the spring is below the pivot point of the jaws, it will urge the lower ends of the jaws apart, as shown in FIG. 3.

The release lanyard 16 is provided with a spring clip 72 which may be securely fixed to one end 73 of the release lanyard by a crimped sleeve 74. The spring clip includes a pair of prongs 76 having opposed, inwardly directed, edges 78 that are adapted to snap into the channel cuts 62 of the jaws. The spring clip is made of a resilient material or includes a spring member such that the prongs may be separated to permit attachment of the spring clip to the jaws, yet retain the jaws in a closed position during transport of ordnance devices. FIG. 1A shows an alternative spring clip 80 wherein the prongs cross each other.

Positioned above the arming block 10 is the solenoid 14 (See FIG. 1). The solenoid includes a case 82, an armature 84, and a solenoid winding 86 wound on a spool 88. The case includes an outer cylindrical wall 90 enclosing the spool. The cylindrical wall is supported by a base 92 of the case. The case also includes a first annular portion 94 extending upwardly from the base into the bore of the spool and a second annular portion 96 extending downwardly from the base. The armature is axially slidable in the bore of the spool above the first annular portion of the case. The armature has a lower conical end 98 which is adapted to be received within a conical seat 100 of the first annular surface of the case.

A lock pin 102 has an upper end 104 that is fixedly mounted to the armature and extends axially down through the case. A lower end of the lock pin has an enlarged portion 108 that is seated in the second annular portion of the case against an O-ring 110.

The armature 84 and the first annular portion 94 of the case each have annular recesses around the lock pin for receiving a spring 112. The spring urges the armature into an upper position as shown in FIG. 2. When the solenoid is energized, however, the armature will be attracted to the first annular portion of the case, compressing the spring and seating itself into the conical seat of the case. The enlarged portion 108 of the lock pin will thus be moved downwardly into the open space 64 between the top ends of the jaws (see FIG. 4).

The top of the solenoid may be closed by an insulating washer 114 having a divider 116 that separates terminals 118 for preventing short circuiting of the connecting wires. Drill holes are provided through the washer for connecting lead wires from the winding 86 to the terminals. An epoxy potting 109, may be applied over the top of the washer to fix it in place. Although a specific solenoid arrangement is shown, it should be appreciated that many different solenoids for moving a lock pin into a locking position between a pair of jaws are known to those having ordinary skill in the art and are easily substituted for the solenoid shown herein. See, e.g., U.S. Pat. No. 2,992,594 to Anderson, U.S. Pat. No. 3,200,707 to West and U.S. Pat. No. 4,179,150 to Conrad et al.

Operation of the release and arming mechanism of the present invention will now be described. With reference to FIG. 2, the arming ring 24 of the arming wire 20 is placed into the enclosure 66 between the jaws. The jaws are then manually held shut against the force of the spring 70 and the spring clip 72 is snapped into place over the jaws holding them in the closed position and retaining the arming ring between the jaws. The opposite end of the release lanyard is securely fixed to the ordnance device (not shown). It will be appreciated that launching the ordnance device will disconnect the spring clip from the jaws. Accordingly, retention of the arming ring between the jaws after the ordnance device has been launched is dependent on whether the solenoid is energized or not.

FIG. 3 illustrates the situation where the solenoid is not energized. In this case, launching of the ordnance device disconnects the spring clip 72 from the jaws 12 permitting the jaws to open in response to the force of the spring 70. Without a retention force acting on the jaws, the arming ring 24 will be released and the ordnance device will remain in a safe condition. In this regard, it is important to note that the release lanyard 16 should be shorter than the arming lanyard 22 so that upon launch of the ordnance device, the spring clip will disconnect from the jaws before the arming ring attempts to pull itself loose from the jaws. Preferably, in the safe condition, the spring clip will disconnect and the arming ring will fall from the jaws by its own weight before being yanked by the arming lanyard. Although FIGS. 1-3 show the use of a low force spring to urge the jaws open upon release of the release lanyard, it will be appreciated that a substantially zero retention force condition may be obtained without using such a spring.

FIG. 4 illustrates the situation where the solenoid is energized. In this case, the armature 84 together with the lock pin 102 are driven downward due to the magnetic field created in the solenoid. The armature will then rest in the conical seat 100 of the core 82 and the enlarged portion 108 of the lock pin will pass through the counterbore 34 into the open space 64 between the top ends of the jaws. When the solenoid is in this position, the application of a downward force on the arming ring 24 will not effect opening of the bottom ends of the jaws because the enlarged portion of the lock pin prevents inward movement of the top ends of the jaws. Thus, the arming wire 20 will be withdrawn from the ordnance device conditioning the ordnance device for detonation.

With reference now to FIGS. 5A and 5B, a modified release and arming mechanism is shown. In this case, the arming block 10 is provided with a pair of bores 120 adjacent its lower end extending from the recess 36 to each side 44 of the arming block. A flared surface 122 is provided on the outer portion of each bore. The jaws 12 have protrusions 124 adapted to loosely fit within the inner portions of the bores. A two-pronged spring clip 126 is used to hold the jaws in the closed position. The spring clip has a coil 128 to provide the spring force and a pair of prongs 130, each prong having an inwardly directed retention piece 132 for insertion into the bore at the flared surface. The retention pieces contact the protrusions, exerting an inwardly directed force to maintain the lower ends of the jaws closed.

FIG. 5A also shows a low retention force spring 140 between the jaws. In this case, the spring is located above the pivot pins 48, thus urging the lower ends of the jaws to their closed position. Such a spring has advantages, provided the spring applies a sufficiently low retention force as not to substantially hinder the release of the arming ring 24 upon launch of the ordnance device. For example, the spring retains the arming ring between the jaws until a spring clip can be attached to the jaws. In contrast, the device shown in FIGS. 1-4 requires two hands to connect the arming ring to the jaws, one hand to hold the jaws closed around the arming ring while the other hand attaches the spring clip to the jaws. This two hand operation can sometimes be difficult to perform in the field. Using a low retention force spring above the pivot points permits an easier one-handed attachment of the arming ring, followed by a one-handed attachment of the spring clip. The retention force of the spring need only be sufficient, typically a few ounces, to temporarily hold the arming ring until the spring clip is attached. This is in contrast to the 10 to 14 pound retention force used in prior devices.

With reference to FIGS. 6A and 6B, another modified release and arming mechanism is shown. In this case, the release lanyard 16 is provided with a jaw retaining pin 150. The pin is inserted through a hole 152 in the arming block to a position between the inside surfaces of the jaws above the pivot pins 48, but preferably below the open space 64. The pin has a tapered surface 154 that is adapted to separate the upper ends of the jaws, thus closing the lower ends of the jaws. The pin may be held in place, thus holding the jaws in the closed position and retaining the arming ring, by using a spring and ball mechanism or other detent mechanism 156. The detent mechanism, e.g., a ball 160, spring 162 and set screw 164, may be inserted through another hole 158 in the arming block to cooperate with a circumferential groove 166 on the pin to hold the pin in place until the ordnance device, to which the other end of the release lanyard is connected, is launched. The set screw 164 may be used to adjust the force applied to hold the pin in place.

It should be appreciated from the foregoing description that the present invention is particularly suitable for field replacement of existing jaw-, ball, or cone-type ordnance delivery systems, thus providing these systems with zero force or low-force retention armament releases. Using a separate release lanyard for retaining the jaws closed during transport, but which releases the jaws upon launch of the ordnance device, also increases system reliability.

It will, of course, be understood that modifications to the presently preferred embodiment will be apparent to those skilled in the art. For example, based on the disclosure herein, the use of other types of spring clips, pins and other devices will be apparent for maintaining the jaws closed until release of the ordnance device. Consequently, the scope of the present invention should not be limited by the particular embodiments discussed above, but should be defined only by the claims set forth below and equivalents thereof.

What is claimed is:

1. A release and arming mechanism for selectively retaining an arming lanyard associated with an ordnance device, the ordnance device being released in an armed condition when the arming lanyard is retained by the mechanism and being released in an unarmed condition when the arming lanyard is not retained by the mechanism, said mechanism comprising:
   an arming block;
   a pair of opposed jaws mounted to the arming block, at least one of said jaws being movable such that the jaws may assume a closed position and an open position, the jaws being configured to retain the arming lanyard between them when held in the closed position and to release the arming lanyard when not held in the closed position;
   solenoid means for selectively holding the jaws in the closed position;
   a release lanyard; and
   means for connecting the release lanyard to the jaws in such a manner as to hold the jaws in the closed position until the release lanyard is disconnected from the jaws.

2. The release and arming mechanism of claim 1, wherein the means for connecting the release lanyard to the jaws includes a spring clip mounted to one end of the release lanyard, the spring clip having a pair of prongs adapted to hold the jaws in the closed position.

3. The release and arming mechanism of claim 1, further comprising a bias spring between the jaws urging the jaws to the open position.

4. The release and arming mechanism of claim 1, further comprising a bias spring between the jaws urging the jaws to the closed position.

5. The release and arming mechanism of claim 1, wherein the pair of opposed jaws are pivotally mounted to the arming block, each jaw having an upper end defining a recess, and the solenoid means includes a lockpin that is movable between an unenergized position wherein the lockpin is not in the recesses of the jaws and an energized position wherein the lockpin is in the recesses of the jaws.

6. The release and arming mechanism of claim 1, wherein the pair of opposed jaws are pivotally mounted to the arming block and have upper portions above their pivot points and lower portions below their pivot points, the lower portions forming an enclosure for holding the arming ring when the jaws are in the closed position, and the means for connecting the release lanyard to the jaws includes a jaw retaining pin mounted to one end of the release lanyard, the jaw retaining pin being positioned between the upper portions of the jaws, preventing the lower portions of the jaws from opening sufficiently to release the arming lanyard.

7. The release and arming mechanism of claim 6, wherein the means for connecting the release lanyard to the jaws further includes a detent mechanism for holding the jaw retaining pin between the upper portions of the jaws.

8. The release and arming mechanism of claim 7, wherein the jaw retaining pin has a tapered surface that is adapted to separate the upper portions of the jaws upon insertion of the pin.

9. The release and arming mechanism of claim 8, wherein the detent mechanism includes a ball and spring mechanism in cooperative engagement with a circumferential groove of the jaw retaining pin.

10. A release and arming mechanism for selectively retaining an arming lanyard associated with an ordnance device, the ordnance device being released in an armed condition when the arming lanyard is retained by the mechanism and being released in an unarmed condition when the arming lanyard is not retained by the mechanism, said mechanism comprising:
   an arming block;
   a pair of opposed jaws mounted to the arming block in a pivotable manner such that they may assume a closed position and an open position, the jaws having upper portions above their pivot points and lower portions below their pivot points, the lower portions being configured to retain the arming lanyard between them when the jaws are held in the closed position and to release the arming lanyard when the jaws are not held in the closed position;
   solenoid means for selectively holding the jaws in the closed position;
   a release lanyard; and
   means for connecting the release lanyard to the jaws in such a manner as to hold the jaws in the closed position until the release lanyard is disconnected from the jaws.

11. The release and arming mechanism of claim 10, further comprising a bias spring between the jaws urging the jaws to the open position.

12. The release and arming mechanism of claim 10, further comprising a bias spring between the jaws urging the jaws to the closed position.

13. The release and arming mechanism of claim 10, wherein each jaw has an upper end defining a recess, and the solenoid means includes a lockpin that is movable between an unenergized position wherein the lockpin is not in the recesses of the jaws and an energized position wherein the lockpin is in the recesses of the jaws.

14. The release and arming mechanism of claim 10, wherein the means for connecting the release lanyard to the jaws includes a jaw retaining pin mounted to one end of the release lanyard, the jaw retaining pin being positioned between the upper portions of the jaws, preventing the lower portions of the jaws from opening sufficiently to release the arming lanyard.

15. The release and arming mechanism of claim 14, wherein the means for connecting the release lanyard to the jaws further includes a detent mechanism for holding the jaw retaining pin between the upper portions of the jaws.

16. The release and arming mechanism of claim 10, wherein the means for connecting the release lanyard to the jaws includes a spring clip mounted to one end of the release lanyard, the spring clip having a pair of prongs adapted to engage and hold the jaws in the closed position.

17. The release and arming mechanism of claim 16, wherein the prongs have opposed edges and each jaw has an outside surface, across the outside surface of each jaw at the lower portion thereof is a channel cut for receiving a respective edge of the prongs.

18. The release and arming mechanism of claim 16, wherein each jaw has an outside surface, the outside surface of each jaw at the lower portion thereof having a protrusion, and the prongs have opposed inwardly directed retention pieces for engaging the protrusions.

19. The release and arming mechanism of claim 18, wherein the arming block defines a recess for receiving the jaws and a pair of bores adapted for receiving the protrusions of the jaws at the bore's inner ends, respectively, and for receiving the retention pieces of the prongs at the bore's outer ends, respectively.

* * * * *